Sept. 3, 1957        S. K. WELLMAN        2,804,947
METALLIC BRAKE SHOE
Filed Aug. 26, 1949
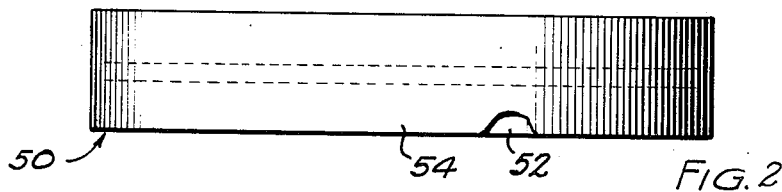
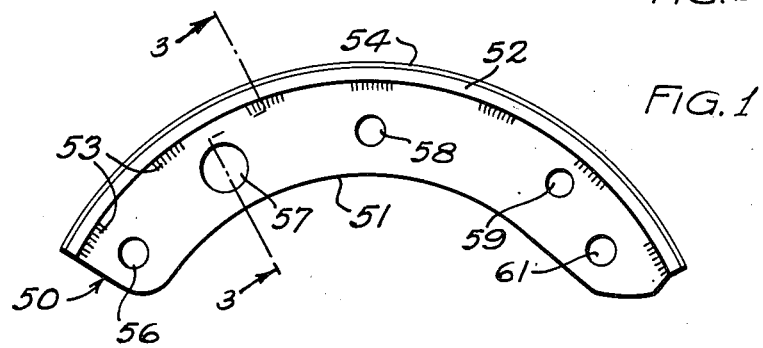
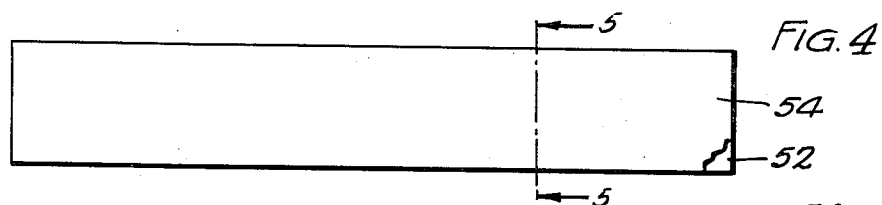
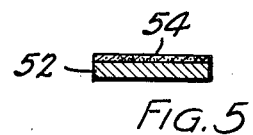
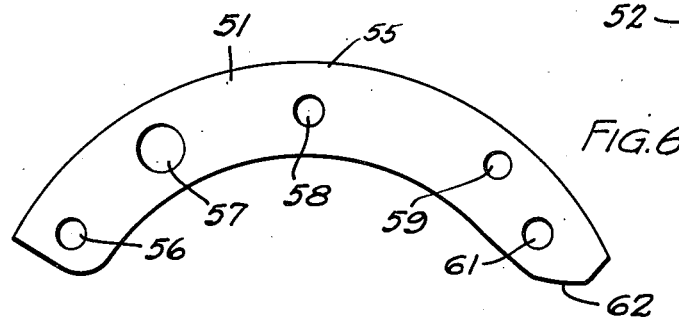
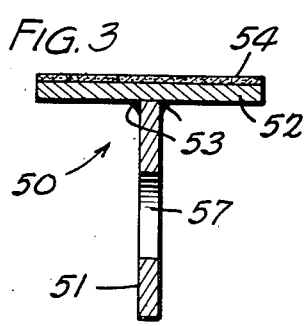
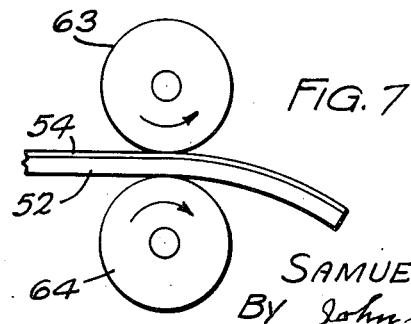
INVENTOR
SAMUEL K. WELLMAN
BY John D. Cox
ATTY.

United States Patent Office 2,804,947
Patented Sept. 3, 1957

2,804,947

METALLIC BRAKE SHOE

Samuel K. Wellman, Cleveland, Ohio, assignor to The S. K. Wellman Company, Bedford, Ohio, a corporation of Ohio Application August 26, 1949, Serial No. 112,476

1 Claim. (Cl. 188—251)

This invention relates to automotive brake shoes, and has as its principal object the provision of a brake shoe construction rendered structurally unique by the absence of conventional brake linings as heretofore ordinarily provided, and characterized by the provision of a unitary, composite friction shoe wherein the friction surface utilized to bear against the surface of the brake drum is a homogeneous layer of powdered metal friction material integral with the sole plate of the brake shoe itself.

A further object of the invention is the provision of an automotive brake shoe wherein the need of any conventional brake lining is obviated by the provision of a friction surface which is actually a part of the shoe rather than being attached to it. In the present invention, the friction surface is composed of a layer of powder of predominantly metallic content, sintered into a compact mass of friction material which may be continuous and uninterrupted throughout the entire friction area of the shoe.

A further object is the provision of an automotive brake shoe having a rigid metal frame, with a layer of metallic friction material thereon, and with the metallic friction material directly and permanently bonded to the metallic frame throughout the entire area of the braking surface, so that the greatest possible support is afforded to the friction material and in order that heat generated by the application of the brake may be readily dissipated through the metallic friction material to the metal frame of the brake shoe.

The most common vehicle brake is of the type comprising a brake drum having a cylindrical braking flange and two internal-expanding brake shoes carrying friction linings adapted to be contacted with the braking flange of the drum by expansion or outward movement of the brake shoes. These shoes are generally formed of solid metal such as steel and provided with a friction lining of nonmetallic materials such as asbestos with a rubber or other plastic binder. The lining is secured to the shoe by rivets extending through both the shoe and lining.

The shortcomings of such conventional brake linings are well known. In the first place, the areas of the rivet holes decrease, to a certain extent, the frictional area or surface of the brake lining, thus shortening the life of the lining. Furthermore, when the lining becomes worn, the rivets become exposed and are likely to score the inner surface of the brake drum. Also, the lining is likely to break at any time across the rivet openings and injure or ruin the lining. This can also damage the brake drum or the shoe.

The advantages of my invention will appear from the following description taken in connection with the accompanying drawings in which Fig. 1 is an elevation of a brake shoe constructed in accordance with my invention;

Fig. 2 is a plan view of the brake shoe of Fig. 1;

Fig. 3 is a vertical section on line 3—3 of Fig. 1 but on an enlarged scale;

Fig. 4 is a plan view of a metallic blank from which is constructed the sole plate of the shoe;

Fig. 5 is a vertical section on line 5—5 of Fig. 4;

Fig. 6 is an elevation of the web of the brake shoe; and

Fig. 7 is a diagrammatic showing of the method of forming the sole plate of the shoe.

Referring now to Figs. 1 and 2 of the drawing there is shown a brake shoe member which comprises a web plate 50 curved edgewise and a thick flange portion or sole plate 52 curved flatwise and conforming to the curvature of the brake drum. The web and sole plates coact to provide a rigid assembly in the form of a T in cross section. This brake shoe member together with its cooperating counterpart, not shown, constitutes the conventional expanding brake shoes for one of the brake drums of a motor vehicle. The web plate 50 is provided with the usual openings 56, 57, 58, 59 and 61 for attachment of the brake shoe actuating mechanism as is usual in such construction.

A thick layer of sintered powdered multi-metal and non-metal material is bonded onto the sole plate 52 which had previously been electroplated, preferably with copper or nickel, to a thickness of about .0002 of an inch. This electroplating serves principally to prevent oxidation or corrosion of the steel during the subsequent sintering operation, thus insuring bonding of the powdered material onto the backing steel plate by the application of heat and pressure.

For use in applications involving high surface speeds as in automobiles, I have found that a copper base mixture containing 3 to 12 parts of molybdenum sulfide to each 100 parts by weight of the total mixture is suitable. Having the base of the mixture of copper or other highly heat-conductive metal is desirable for achieving uniform surface temperatures. The mixture also should contain minor amounts of tin to harden the copper, small amounts of lead which act as a lubricant, and small amounts of non-metallic materials such as silica and graphite to act as lubricants and as polishing agents to free the brake drum from any lead smeared thereon. Normally, also, it is advisable to add small percentages of iron to provide a hard ingredient.

The powdered material is first spread uniformly in a mold in layers of the desired thickness for brake lining for the desired type of brake and is then cold pressed.

The powder is then placed on the copper plated steel flat sole plate 52 and the assemblies pressed together under a pressure of from 100 pounds to 250 pounds per square inch and simultaneously heated under non-oxidizing conditions for a sufficient length of time and to a sufficient temperature to cause the powder layer to sinter together and integrally bond to the steel. A temperature of approximately 1500 degrees F. is sufficient. During this heating operation, the intermediate electroplated layer of copper or nickel substantially disappears so that in the final product there is a direct bonding of the friction layer 54 and the steel sole plate 52. Thus, a unitary article is produced. This article is now a flat straight member and is in condition to be made to conform to the curvature of the web plate 50 to which it is later attached.

Although it is possible to bend the sintered friction material and its steel sole plate in one pass between the conventional pressure rolls 63 and 64, it is desirable to utilize several progressive workings in order to eliminate any danger or likelihood of chipping or cracking of a sintered surface. The pressure of the rolls may be varied as required, in the usual manner. Passing between the pressure rolls causes the article to bend with the sintered surface toward the convex side so as to conform to the concave surface of the brake drum and fit the curved edge 55 of the web plate to which it may be attached.

The web and flange member when assembled from a T in cross section as seen in Fig. 3. The width, length, and curvature of the flange member will correspond to the dimensions of the flange of the brake drum with which it is to be used. The thickness will be determined by the braking load to be applied and the length of life desired. For a passenger car brake requiring a shoe having a flange member approximately 12 inches long, 1¾ inches wide and curved to approximately 5½ inches, a sole plate thickness of ¼ inch is suitable to obtain the requisite strength.

Bonded on the convex surface of the sole plate flange member 52 is a layer of sintered multi-metal and non-metallic powder material which constitutes the friction material 54. The material of this lining may be approximately ⅛ inch thick.

After the brake sole plate 52 has had the sintered friction material bonded thereon and has been passed a sufficient number of times between the pressure rolls 63, 64 to cause the flange member to assume the curvature of the convex edge 55 of the web member 51, it is positioned along its longitudinal center line on the edge 55 and welded by any suitable means at intervals as at 53 to said edge. The assembly forms a rigid structure with a sintered metallic friction surface that has a very high friction coefficient, yet it is capable of quickly dissipating heat through the shoe and thus not susceptible to fading.

This is a continuation-in-part of my application Serial No. 597,244, filed June 2, 1945 for Brake Shoe and Method of Making the Same.

I claim as my invention:

As an article of manuacfure, an integral composite metallic brake shoe for automotive brakes of the type having a cylindrical brake drum adapted to enclose a plurality of internal expanding brake shoes of T-shaped transverse cross section; said shoe consisting of a relatively flat, rigid, arcuate web plate of solid metal forming the stem of the T; a relatively thick, rigid, self-supporting sole plate arcuately curved around the outer edge of said web plate and forming the head of the T, with the inner concave surface of said sole plate directly and permanently attached to said web plate; in combination with an external convex friction element consisting of an imperforate porous metallic layer of homogeneous composition throughout extending continuously and uninterruptedly across the convex external face of said sole plate, said layer consisting solely of a predominantly metallic powder sintered and bonded directly to said sole plate of the brake shoe at all points throughout the area of said layer.

References Cited in the file of this patent

UNITED STATES PATENTS

| | | |
|---|---|---|
| 1,657,852 | Bendix | Jan. 31, 1928 |
| 1,659,368 | Long | Feb. 14, 1928 |
| 1,756,936 | Bendix | May 6, 1930 |
| 1,909,256 | Emmord | May 16, 1933 |
| 1,947,894 | Whitworth | Feb. 20, 1934 |
| 1,950,223 | Budd | Mar. 6, 1934 |
| 2,057,753 | Whitworth | Oct. 20, 1936 |
| 2,082,904 | Podany | June 8, 1937 |
| 2,289,311 | Wellman | July 7, 1942 |
| 2,299,877 | Calkins | Oct. 27, 1942 |
| 2,381,736 | Goepfrich | Aug. 7, 1945 |
| 2,381,941 | Wellman et al. | Aug. 14, 1945 |
| 2,446,891 | Tower et al. | Aug. 10, 1948 |
| 2,446,892 | Lowey | Aug. 10, 1948 |
| 2,476,588 | Dreher | July 19, 1949 |

FOREIGN PATENTS

| | | |
|---|---|---|
| 25,392/30 | Australia | Mar. 12, 1931 |